(12) United States Patent
Hendry et al.

(10) Patent No.: US 9,654,786 B2
(45) Date of Patent: May 16, 2017

(54) IMAGE DECODING METHOD AND APPARATUS USING SAME

(71) Applicant: LG ELECTRONICS INC., Seoul (KR)

(72) Inventors: Hendry Hendry, Seoul (KR);
Joonyoung Park, Seoul (KR);
Chulkeun Kim, Seoul (KR);
Byeongmoon Jeon, Seoul (KR);
Jungsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 14/419,879

(22) PCT Filed: Sep. 9, 2013

(86) PCT No.: PCT/KR2013/008119
§ 371 (c)(1),
(2) Date: Feb. 5, 2015

(87) PCT Pub. No.: WO2014/038905
PCT Pub. Date: Mar. 13, 2014

(65) Prior Publication Data
US 2015/0201203 A1      Jul. 16, 2015

Related U.S. Application Data

(60) Provisional application No. 61/698,706, filed on Sep. 9, 2012.

(51) Int. Cl.
*H04N 7/12*      (2006.01)
*H04N 19/29*      (2014.01)
(Continued)

(52) U.S. Cl.
CPC ............. *H04N 19/29* (2014.11); *H04N 19/12* (2014.11); *H04N 19/132* (2014.11);
(Continued)

(58) Field of Classification Search
CPC ........ H04N 19/29; H04N 19/44; H04N 19/51; H04N 19/184; H04N 19/132
(Continued)

(56) References Cited

U.S. PATENT DOCUMENTS

| | | | |
|---|---|---|---|
| 2007/0286283 A1 | 12/2007 | Yin et al. | |
| 2011/0122944 A1* | 5/2011 | Gupta | .................. H04N 19/176 375/240.12 |

(Continued)

FOREIGN PATENT DOCUMENTS

| | | | |
|---|---|---|---|
| KR | 10-2008-0008205 A | 1/2008 | |
| KR | 10-0885443 B1 | 2/2009 | |

(Continued)

OTHER PUBLICATIONS

Danny Hong et al., "Scalability Support in HEVC", 6th Meeting: Torino, IT, Jul. 14-22, 2011, Joint Collaborative Team on Video Coding (JCT-VC) of ITU-T SG16 WP3 and ISO/IEC JTC1/SC29/WG11, JCTVC-F290, Jul. 12, 2011, pp. 1-15.
(Continued)

*Primary Examiner* — Tung Vo
(74) *Attorney, Agent, or Firm* — Dentons US LLP

(57) ABSTRACT

The present invention relates to a method and an apparatus for decoding an image, for decoding a bitstream including a plurality of layers. The image decoding method may comprise: a step of receiving and identifying dependency information indicating whether an upper layer is coded by the same coding method as a lower layer; and a step of recovering the image of the upper layer based on the identified dependency information. Thus, information indicating
(Continued)

whether the information of the reference layer which the current layer refers to is encoded data or recovered value can be identified.

14 Claims, 8 Drawing Sheets

(51) Int. Cl.
| | | |
|---|---|---|
| *H04N 19/30* | (2014.01) | |
| *H04N 19/132* | (2014.01) | |
| *H04N 19/184* | (2014.01) | |
| *H04N 19/44* | (2014.01) | |
| *H04N 19/51* | (2014.01) | |
| *H04N 19/139* | (2014.01) | |
| *H04N 19/176* | (2014.01) | |
| *H04N 19/134* | (2014.01) | |
| *H04N 19/187* | (2014.01) | |
| *H04N 19/70* | (2014.01) | |
| *H04N 19/12* | (2014.01) | |
| *H04N 19/59* | (2014.01) | |

(52) U.S. Cl.
CPC ......... *H04N 19/134* (2014.11); *H04N 19/139* (2014.11); *H04N 19/176* (2014.11); *H04N 19/184* (2014.11); *H04N 19/187* (2014.11); *H04N 19/30* (2014.11); *H04N 19/44* (2014.11); *H04N 19/51* (2014.11); *H04N 19/70* (2014.11); *H04N 19/59* (2014.11)

(58) Field of Classification Search
USPC .................................................. 375/240.16
See application file for complete search history.

(56) References Cited

U.S. PATENT DOCUMENTS

| | | | | |
|---|---|---|---|---|
| 2011/0274178 | A1* | 11/2011 | Onno ..................... | H04N 19/70 |
| | | | | 375/240.25 |
| 2012/0044322 | A1* | 2/2012 | Tian ..................... | H04N 19/597 |
| | | | | 348/43 |
| 2013/0002816 | A1* | 1/2013 | Hannuksela .............. | G06T 9/00 |
| | | | | 348/43 |
| 2013/0016776 | A1* | 1/2013 | Boyce ..................... | H04N 19/30 |
| | | | | 375/240.06 |
| 2013/0037760 | A1 | 2/2013 | Maeda et al. | |
| 2013/0243100 | A1* | 9/2013 | Liu ..................... | H04N 19/105 |
| | | | | 375/240.25 |

FOREIGN PATENT DOCUMENTS

| | | |
|---|---|---|
| KR | 10-2009-0098825 A | 9/2009 |
| KR | 10-1014432 B1 | 2/2011 |
| WO | 2013009441 A2 | 1/2013 |
| WO | 2013/163155 A1 | 10/2013 |

OTHER PUBLICATIONS

D. Hong et al., "Scalability Support in HEVC", 97. MPGE Meeting, No. m20710, Jul. 14-22, 2011, Torino, IT, p. 1-15.

J. Boyce et al., "Extensible High Layer Syntax for Scalability", No. JCTVC-E279, Mar. 16-23, 2011, Geneva, CH, p. 1-10.

* cited by examiner

IMAGE DECODING METHOD AND APPARATUS USING SAME

This application is a National Stage Entry of International Application No. PCT/KR2013/008119 filed Sep. 9, 2013, and claims the benefit of U.S. Provisional Application No. 61/698,706 filed Sep. 9, 2012, both of which are hereby incorporated by reference for all purposes as if fully set forth herein in their entireties.

TECHNICAL FIELD

The present invention relates to a video compression technique, and more particularly, to a method and an apparatus for performing scalable video coding (SVC).

BACKGROUND ART

In recent years, demands for high-resolution and high-quality videos have increased more and more in various fields of applications. As pictures have higher resolution and higher quality, the amount of information on the pictures also increases.

With the increase in the amount of data, multi-functional devices and networks with various environments are introduced. With the development of the apparatuses having a variety of performance and the networks having various environments, the same contents may be used with different levels of quality.

Specifically, as terminals are able to support diverse qualities of pictures and various network environments are established, a picture with general quality is enabled in one environment while a higher-quality picture may be available in another environment.

For example, a user having purchased video contents through a mobile terminal can enjoy the video contents on a large-screen display with a higher resolution at his or her home.

In recent years, as high definition (HD) broadcast services are available, a large number of users are getting used to high-resolution and high-quality videos and service providers and service users also pay attention to ultrahigh-definition (UHD) services having a resolution four times higher than HDTV.

Thus, there is a need to provide scalability to video quality, for example, the image quality, resolution, size and frame rate of a video, based on high-efficiency encoding and decoding methods on a high-capacity video so as to offer varied qualities of video services in different environments for users' demands.

SUMMARY OF THE INVENTION

Technical Problems

An object of the invention is to provide a method for predicting a current layer using information on another layer, and an apparatus using the same.

Another object of the invention is to provide an apparatus for receiving and identifying information indicating whether information on a reference layer that a current layer refers to is coded data or a reconstructed value, and a method using the same.

Still another object of the invention is to provide a method for identifying an inter-layer dependency type when videos coded by different coding schemes modes are decoded, and an apparatus using the same.

Technical Solution

According to an aspect of the invention, there is provided a video decoding method that decodes a bitstream including a plurality of layers, the video decoding method may include receiving and identifying dependency information indicating whether an upper layer is coded by the same coding method as a lower layer; and reconstructing a video of the upper layer based on the identified dependency information.

The dependency information may include information indicating whether the upper layer refers to coded data on the lower layer.

The coded data may include at least one of motion information, block partitioning and a residual with respect to a video of the lower layer.

The reconstructing of the video of the upper layer may include parsing the coded data on the lower layer; and predicting a motion of the video of the upper layer by referring to the motion information.

The dependency information may include information indicating whether the upper layer refers to reconstructed data on the lower layer.

The reconstructed data may include an upsampled sample value of a video of the lower layer.

The reconstructing of the video of the upper layer may include predicting the video of the upper layer by referring to the sample value.

The dependency information is comprised and received in a video parameter set in the bitstream.

The dependency information is comprised and received in a slice header in the bitstream.

According to another aspect of the invention, there is provided a video decoding apparatus that decodes a bitstream comprising a plurality of layers, the video decoding apparatus may include a dependency information identification module to receive and identify dependency information indicating whether an upper layer is coded by the same coding method as a lower layer; and an upper layer decoding module to reconstruct a video of the upper layer based on the identified dependency information.

Advantageous Effects

According to one embodiment of the present invention, there are provided a method for predicting a current layer using information on another layer, and an apparatus using the same.

According to one embodiment of the present invention, there are provided an apparatus for receiving and identifying information indicating whether information on a reference layer that a current layer refers to is coded data or a reconstructed value, and a method using the same.

According to one embodiment of the present invention, there are provided a method for identifying an inter-layer dependency type when videos coded by different coding schemes modes are decoded, and an apparatus using the same.

DESCRIPTION OF EMBODIMENTS

Figure 1:
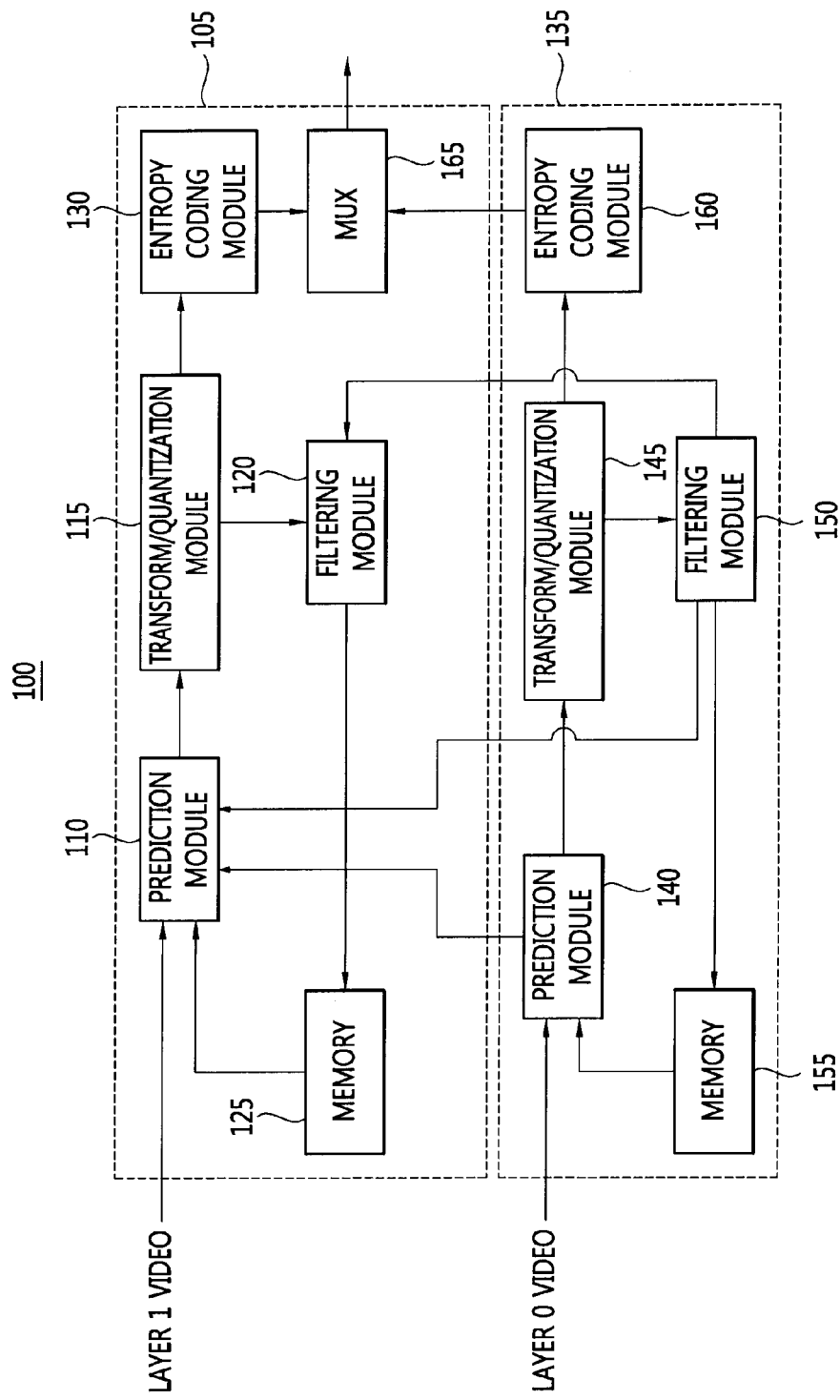
FIG. 1 is a block diagram schematically illustrating a video encoding apparatus that supports scalability according to an embodiment of the invention.

The present invention can be variously modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

In a video coding method that supports scalability (hereinafter, referred to as "scalable coding"), input signals can be processed by layers. Depending on the layers, the input signals (input videos) may be different from each other in at least one of resolution, frame rate, bit depth, color format, and aspect ratio.

In this description, scalable coding includes scalable encoding and scalable decoding.

In scalable encoding/decoding, it is possible to reduce duplicate transmission/processing of information and to enhance compression efficiency by performing inter-layer prediction using an inter-layer difference, that is, on the basis of scalability.

FIG. 1 is a block diagram schematically illustrating a video encoding apparatus that supports scalability according to an embodiment of the invention.

Referring to FIG. 1, the video encoding apparatus 100 includes an encoding module 105 for layer 1 and an encoding module 135 for layer 0.

Layer 0 may be a base layer, a reference layer or a lower layer, and layer 1 may be an enhancement layer, a current layer or an upper layer.

The encoding module 105 for layer 1 includes a prediction module 110, a transform/quantization module 115, a filtering module 120, a decoded picture buffer (DPB) 125, an entropy coding module 130, and a multiplexer (MUX) 165.

The encoding module 135 for layer 0 includes a prediction module 140, a transform/quantization module 145, a filtering module 150, a DPB 155, and an entropy coding module 160.

The prediction modules 110 and 140 may perform inter prediction and intra prediction on an input video. The prediction modules 110 and 140 may perform the predictions by predetermined processing units. The processing unit for prediction may be a coding unit (CU), a prediction unit (PU), or may be a transform unit (TU).

For example, the prediction modules 110 and 140 may determine whether to conduct inter prediction or intra prediction by CU, may determine a prediction mode by PU, and may perform prediction by PU or TU. Prediction to be performed includes construction of a predicted block and construction of a residual block (residual signal).

In the inter prediction, the prediction may be performed on the basis of information on at least one of a previous picture and/or a subsequent picture of a current picture to construct a predicted block. In the intra prediction, the prediction may be performed on the basis of information on a pixel in a current picture to construct a predicted block.

Examples of an inter prediction mode or method include a skip mode, a merge mode, a motion vector predictor (MVP) mode. In the inter prediction, a reference picture for a current PU to be predicted may be selected and a reference block corresponding to the current PU may be selected from the reference picture. The prediction modules 110 and 140 may construct a predicted block on the basis of the reference block.

The predicted block may be constructed as an integer sample unit or as a fractional pixel unit. Here, a motion vector may also be represented in a fractional pixel.

Motion information in the inter prediction, that is, information such as an index, a motion vector and a residual signal of a reference picture, is entropy-encoded and is transmitted to a video decoding apparatus. When a skip mode is applied, the residual signal may not be created, transformed, quantized, and transmitted at all.

Prediction modes in the intra prediction may include 33 directional prediction modes and at least two non-directional modes. The non-directional modes may include a DC prediction mode and a planar mode. In the intra prediction, a predicted block may be constructed after a filter is applied to a reference sample.

A PU may be a block with various sizes and shapes. For example, in inter prediction, a PU may be a 2N×2N, 2N×N, N×2N or N×N block (where N is an integer). In intra prediction, a PU may be a 2N×2N or N×N block (where N is an integer). A PU with a size of N×N may be set to be applied only to a specific case. For example, the PU with the size of N×N may be set to be used only for a smallest CU or only for intra prediction. In addition to the PUs with the above-mentioned sizes, a PU may be further defined as an N×mN block, an mN×N block, a 2N×mN block, or an mN×2N block (where m<1) for use.

The prediction module 110 may perform prediction for layer 1 using information on layer 0. In this specification, a process of predicting current layer information using another layer information is defined as an inter-layer prediction for convenience.

The current layer information predicted using the other layer information (that is, predicted by the inter-layer prediction) may include a texture, motion information, unit information, a predetermined parameter (for example, a filtering parameter), or the like.

The other layer information used for predicting the current layer information (that is, used for the inter-layer prediction) may include a texture, motion information, unit information, a predetermined parameter (for example, a filtering parameter), or the like.

As an example of the inter-layer prediction, an inter-layer motion prediction is also referred to as an inter-layer inter prediction. According to the inter-layer inter prediction, prediction for a current block of layer 1 (current layer or enhancement layer) may be carried out using motion information on layer 0 (reference layer or base layer).

When the inter-layer inter prediction is employed, motion information on a reference layer may be scaled.

As another example of the inter-layer prediction, an inter-layer texture prediction is also referred to as an inter-layer intra prediction or intra base layer (BL) prediction. The inter-layer texture prediction may be employed when a reference block in a reference layer is reconstructed by intra prediction.

The inter-layer intra prediction may use a texture of a reference block in a reference layer as a predictive value for a current block in an enhancement layer. Here, the texture of the reference block may be scaled by upsampling.

As still another example of the inter-layer prediction, an inter-layer unit parameter prediction may derive unit (CU, PU and/or TU) information on a base layer to be used as unit information on an enhancement layer or to determine unit information on an enhancement layer based on the unit information on the base layer.

Unit information may include information in each unit level. For instance, CU information may include information on partition (CU, PU and/or TU), information on transformation, information on prediction, and information on coding. PU information may include information on PU partition and information on prediction (for example, motion information and information on a prediction mode). TU information may include information on TU partition and information on transformation (transform coefficients and transform methods).

Unit information may include only partition information on a processing unit (for example, CU, PU, TU, etc.).

As yet another example of the inter-layer prediction, an inter-layer parameter prediction may derive a parameter used in a base layer to be reused for an enhancement layer or may predict a parameter for the enhancement layer based on the parameter used in the base layer.

Although the inter-layer texture prediction, the inter-layer motion prediction, the inter-layer unit information prediction and the inter-layer parameter prediction have been illustrated above as inter-layer predictions, alternative inter-layer predictions may also be applicable to the present invention, without limiting thereto.

For example, the prediction module 110 may conduct, as an inter-layer prediction, an inter-layer residual prediction of predicting a residual of a current layer using residual information on another layer and performing prediction for a current block in the current layer based on the residual.

Further, the prediction module 110 may conduct, as an inter-layer prediction, an inter-layer differential prediction of performing prediction for a current block in a current layer using a differential picture between pictures obtained by upsampling or downsampling a reconstructed picture of the current layer and a reconstructed picture of another layer.

In addition, the prediction module 110 may employ, as an inter-layer prediction, an inter-layer syntax prediction for predicting or generating a texture of a current block using syntax information on another layer. Here, the syntax information on the reference layer used for prediction of the current block may be information on an intra prediction mode, motion information, or the like.

Here, the inter-layer syntax prediction may be performed by referring to an intra prediction mode from a block (intra) in the reference layer to which the intra prediction mode is applied and by referring to motion information from a block (MV) to which an inter prediction mode is applied.

For instance, although the reference layer is a P slice or B slice, a reference block in the slice may be a block subjected to an intra prediction mode. In this case, when the inter-layer syntax prediction is applied, inter-layer prediction of generating/predicting the texture of the current block may be performed using the intra prediction mode of the reference block of the syntax information on the reference layer.

A plurality of methods among the foregoing various inter-layer prediction methods may be used for predicting a particular block. For instance, to predict a current block, unit information on corresponding layer 0 or a corresponding block, filtering parameter information, or the like may be additionally used while prediction information on layer 0 is used. Such a combination of inter-layer prediction methods may also be applied to prediction which will be mentioned below in this specification.

The transform/quantization modules 115 and 145 may transform the residual block by TU to create transform coefficients and may quantize the transform coefficients.

A transform block is a rectangular block of samples to which the same transformation is applied. The transform block may be a TU and may have a quad-tree structure.

The transform/quantization modules 115 and 145 may perform transformation based on a prediction mode applied to the residual block and a size of the block and a size of the transform block to create a two-dimensional (2D) array of transform coefficients. For example, when intra prediction is applied to the residual block and the residual block has a 4×4 array, the residual block may be transformed using discrete sine transform (DST). Otherwise, the residual block may be transformed using discrete cosine transform (DCT).

The transform/quantization modules 115 and 145 may quantize the transform coefficients to create the quantized transform coefficients.

The transform/quantization modules 115 and 145 may transmit the quantized transform coefficients to the entropy coding modules 130 and 160. Here, the transform/quantization module and 145 may rearrange the 2D array of the quantized transform coefficients into a one-dimensional (1D) array in a predetermined scan order and may transmit the rearranged 1D array to the entropy coding modules 130 and 160. The transform/quantization modules 115 and 145 may transmit a reconstructed block generated on the basis of the residual block and the predicted block to the filtering modules 120 and 150 for inter prediction, without being transformation/quantization.

If necessary, the transform/quantization modules 115 and 165 may skip transformation and perform only quantization or may skip both transformation and quantization. For example, the transform/quantization modules 115 and 165 may skip transformation for a block involving a specific prediction method or having a specific size, or a block involving a specific prediction block and having a specific size.

The entropy coding modules 130 and 180 may perform entropy encoding on the quantized transform coefficients. An encoding method, such as exponential Golomb coding and context-adaptive binary arithmetic coding (CABAC), may be used for entropy encoding.

The filtering modules 120 and 150 may apply a deblocking filter, an adaptive loop filter (ALF), or a sample adaptive offset (SAO) to a reconstructed picture.

The deblocking filter may remove a block distortion generated on boundaries between blocks in the reconstructed picture. The ALF may perform a filtering process on the basis of a resulting value of comparing the original picture with the reconstructed picture of which the blocks are filtered by the deblocking filter. The SAO may reconstruct an offset difference by pixel between the residual block having been subjected to the deblocking filter and the original picture and is applied in a form of a band offset, an edge offset, or the like.

The filtering modules 120 and 150 may not apply all of the deblocking filter, the ALF and the SAO, but may apply only the deblocking filter, may apply only the deblocking filter and the ALF, or may apply only the deblocking filter and the SAO.

The DPBs 125 and 155 may receive and store the reconstructed block or the reconstructed picture from the filtering modules 120 and 150. The DPB 125 and 155 may provide the reconstructed block or picture to the prediction modules 110 and 140 that perform inter prediction.

Information output from the entropy coding module 160 for layer 0 and information output from the entropy coding module 130 for layer 1 may be multiplexed by the MUX 165 and may be output as a bitstream.

Although the encoding module 105 for layer 1 has been described to include the MUX 165 for convenience, the MUX may be a device or module independent of the encoding module 105 for layer 1 and the encoding module 135 for layer 0.

The encoding apparatus of FIG. 1 may be configured as an electronic apparatus capable of capturing and encoding an image including a camera. For example, the encoding apparatus may be configured as or included in an electronic apparatus, such as a television, a computer system and a portable electronic device including a mobile phone or a tablet PC.

Figure 2:
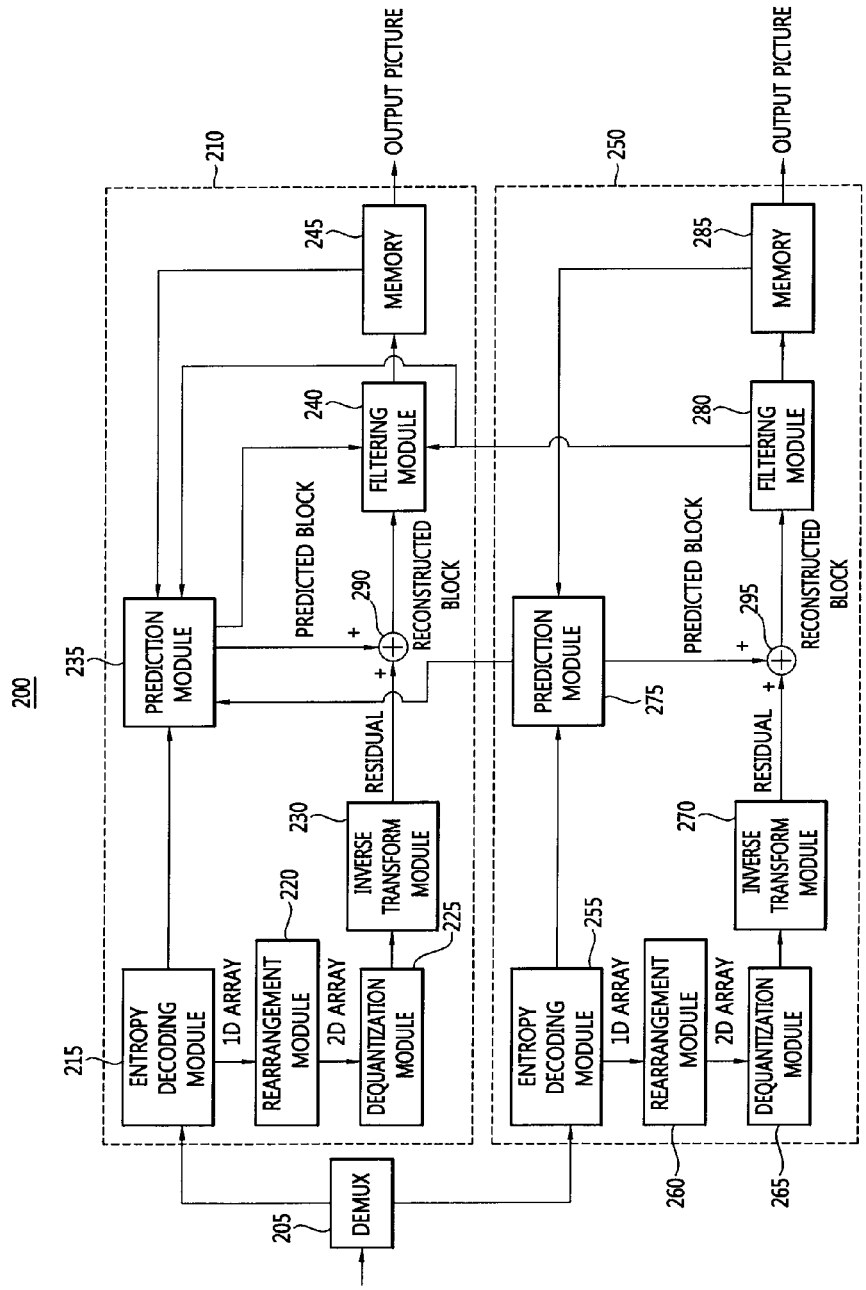
FIG. 2 is a block diagram schematically illustrating a video decoding apparatus that supports scalability according to an embodiment of the invention.

FIG. 2 is a block diagram illustrating an example of inter-layer prediction in a video decoding apparatus performing scalable coding according to the invention.

Referring to FIG. 2, the video decoding apparatus 200 includes a decoding module 210 for layer 1 and a decoding module 250 for layer 0.

Layer 0 may be a base layer, a reference layer or a lower layer, and layer 1 may be an enhancement layer, a current layer or an upper layer.

The decoding module 210 for layer 1 may include an entropy decoding module 215, a rearrangement module 220, a dequantization module 225, an inverse transform module 230, a prediction module 235, a filtering module 240, and a memory.

The decoding module 250 for layer 0 may include an entropy decoding module 255, a rearrangement module 260, a dequantization module 265, an inverse transform module 270, a prediction module 275, a filtering module 280, and a memory 285.

When a bitstream including video information is transmitted from the video encoding apparatus, a demultiplexer (DEMUX) 205 may demultiplex the information by layers and may transmit the information to decoders by layers.

The entropy decoding modules 215 and 255 may perform entropy decoding corresponding to an entropy coding method used in the video encoding apparatus. For example, when CABAC is used in the video encoding apparatus, the entropy decoding modules 215 and 255 may perform entropy decoding using CABAC.

Information for constructing a predicted block out of information decoded by the entropy decoding modules 215 and 255 may be provided to the prediction modules 235 and 275, and residual valuesentropy-decoded by the entropy decoding modules 215 and 255, that is, quantized transform coefficients, may be input to the rearrangement modules 220 and 260.

The rearrangement modules 220 and 260 may rearrange the information of the bitstream entropy-decoded by the entropy decoding modules 215 and 255, that is, the quantized transform coefficients, on the basis of a rearrangement method used in the video encoding apparatus.

For example, the rearrangement modules 220 and 260 may rearrange a 1D array of the quantized transform coefficients back into a 2D array of coefficients. The rearrangement modules 220 and 260 may perform scanning on the basis of a prediction mode applied to a current block (transform block) and/or a size of the transform block to construct a 2D array of coefficients (quantized transform coefficients).

The dequantization modules 225 and 265 may perform dequantization on the basis of a quantization parameter transmitted from the video encoding apparatus and the rearranged coefficients of the block to create transform coefficients.

The inverse transform modules 230 and 270 may perform inverse transformation of transformation performed by a transform module of the video encoding apparatus on the transform coefficients. The inverse transform modules 230 and 270 may perform inverse DCT and/or inverse DST of DCT and DST performed by the video encoding apparatus.

In the video encoding apparatus, DCT and/or DST may be selectively performed depending on a plurality of information pieces, such as a prediction method, a size of a current block and a prediction direction, and the inverse transform modules 230 and 270 of the video decoding apparatus may perform inverse transformation on the basis of transform information used by the video decoding apparatus.

For example, the inverse transform modules 230 and 270 may perform inverse DCT and inverse DST depending on a prediction mode/block size. Specifically, the inverse transform modules 230 and 270 may perform inverse DST on a 4×4 luma block to which intra prediction has been applied.

Alternatively, the inverse transform modules 230 and 270 may fixedly use a specific inverse transformation method regardless of a prediction mode/block size. For example, the inverse transform modules 230 and 270 may apply only inverse DST to all transform blocks. The inverse transform modules 230 and 270 may also apply only inverse DCT to all transform blocks.

The inverse transform modules 230 and 270 may inversely transform the transform coefficients or a block of the transform coefficients to construct a residual signal or a residual block.

The inverse transform modules 230 and 270 may skip transformation if necessary or depending on an encoding method used for the video encoding apparatus. For example, the inverse transform modules 230 and 270 may skip transformation for a block involving a specific prediction method or having a specific size, or a block involving a specific prediction block and having a specific size.

The prediction modules 235 and 275 may construct a predicted block of the current block on the basis of predicted block construction information provided from the entropy decoding modules 215 and 255 and information on a previously decoded block and/or picture provided from the memories 245 and 285.

When a prediction mode for the current block is an intra prediction mode, the prediction modules 235 and 275 may perform intra prediction on the current block on the basis of information on a pixel in a current picture.

When the prediction mode for the current block is an inter prediction mode, the prediction modules 235 and 275 may perform inter prediction on the current block on the basis of information included in at least one of a previous picture and a subsequent picture of the current picture. Part or all of motion information necessary for inter prediction may be derived based on information received from the video encoding apparatus.

When the skip mode is used as an inter prediction mode, the residual may not be transmitted from the video encoding apparatus and the predicted block may be used as a reconstructed block.

The prediction module 235 for layer 1 may perform inter prediction or intra prediction using only information in layer 1 and may perform inter-layer prediction using information on another layer (layer 0).

For instance, the prediction module 235 for layer 1 may perform prediction for the current block using one of motion information on layer 1, texture information on layer 1, unit information on layer 1 and parameter information on layer 1.

The prediction module 235 for layer 1 may receive the motion information on layer 1 from the prediction module 275 for layer 0 and may perform motion prediction. The inter-layer motion prediction is also referred to as an inter-layer inter prediction. By the inter-layer motion prediction, prediction for the current block in the current layer (enhancement layer) may be performed using the motion information on the reference layer (base layer). If necessary, the prediction module 235 may scale and use the motion information on the reference layer.

The prediction module 235 for layer 1 may receive the texture information on layer 0 from the prediction module 275 for layer 0 and may perform texture prediction. The texture prediction is also referred to as an inter-layer intra prediction or intra base layer (BL) prediction. The texture prediction may be employed when a reference block in a reference layer is reconstructed by intra prediction. Alternatively, the texture prediction may refer to a reference layer allocated a reference index.

In the inter-layer intra prediction, a texture of a reference block in a reference layer may be used as a predictive value for the current block in the enhancement layer. Here, the texture of the reference block may be scaled by upsampling.

The prediction module 235 for layer 1 may receive unit parameter information on layer 0 from the prediction module 275 for layer 0 and may perform unit parameter prediction. By the unit parameter prediction, unit (CU, PU, and/or TU) information on the base layer may be used as unit information on the enhancement layer or unit information on the enhancement layer may be determined on the basis of the unit information on the base layer.

The prediction module 235 for layer 1 may receive filtering parameter information on layer 0 from the prediction module 275 for layer 0 and may perform parameter prediction. By the parameter prediction, a parameter used for the base layer may be derived to be reused for the enhancement layer or a parameter for the enhancement layer may be predicted on the basis of the parameter used for the base layer.

A plurality of methods among the foregoing various inter-layer prediction methods may be used for predicting a particular block. For instance, to predict a current block, unit information on corresponding layer 0 or a corresponding block, filtering parameter information, or the like may be additionally used while prediction information on layer 0 is used. Such a combination of inter-layer prediction methods may also be applied to prediction which will be mentioned below in this specification.

Adders 290 and 295 may construct a reconstructed block using the predicted block constructed by the prediction modules 235 and 275 and the residual block constructed by the inverse transform modules 230 and 270. In this case, the adders 290 and 295 may be considered as separate modules (reconstructed block constructing module) that construct a reconstructed block.

The block and/or picture reconstructed by the adders 290 and 295 may be supplied to the filtering modules 240 and 280.

Referring to FIG. 2, the filtering module 240 for layer 1 may perform a filtering operation on the reconstructed picture using the parameter information transmitted from the prediction module 235 for layer 0 and/or the filtering module 280 for layer 1. For example, the filtering module 240 for layer 1 may perform a filtering operation on layer 1 or an inter-layer filtering operation using a parameter predicted from a filtering parameter applied to layer 0.

The memories 245 and 285 may store the reconstructed block or picture for use as a reference picture or reference block. The memories 245 and 285 may output the reconstructed picture stored in the memories 245 and 285 via a predetermined output module (not shown) or a display (not shown).

Although FIG. 2 illustrates the rearrangement modules, the dequantization modules and the inverse transform modules as independent modules, the video decoding apparatus may also be configured to enable the dequantization/inverse transform modules as a single module to sequentially perform rearrangement, dequantization, and inverse transform like the video encoding apparatus of FIG. 1.

Although FIGS. 1 and 2 illustrate the prediction modules, the prediction module for layer 1 may include an inter-layer prediction module that performs a prediction process using information on another layer (layer 0) and an inter/intra prediction module that performs a prediction process without using information on another layer (layer 0).

The decoding apparatus of FIG. 2 may be configured as various electronic apparatuses capable of reproducing an image or reproducing and displaying an image. For example, the decoding apparatus may be configured as or included in an electronic apparatus, such as a set-top box, a television, a computer system and a portable electronic device including a mobile phone or a tablet PC.

In encoding and decoding a video supporting a plurality of layers in a bitstream, that is, scalable coding, there are strong correlations among the plurality of layers. Thus, when prediction is performed using the correlations, redundant elements of data may be removed and video encoding performance may be enhanced. Predicting a current layer to be predicted using information on another layer is defined below as inter-layer prediction. Hereinafter, scalable video coding refers to scalable video encoding in encoding, and to scalable video decoding in decoding.

A plurality of layers may be different from one another in at least one of resolution, frame rate and color format, and upsampling or downsampling of a layer may be performed to adjust resolution in inter-layer prediction.

Figure 3:
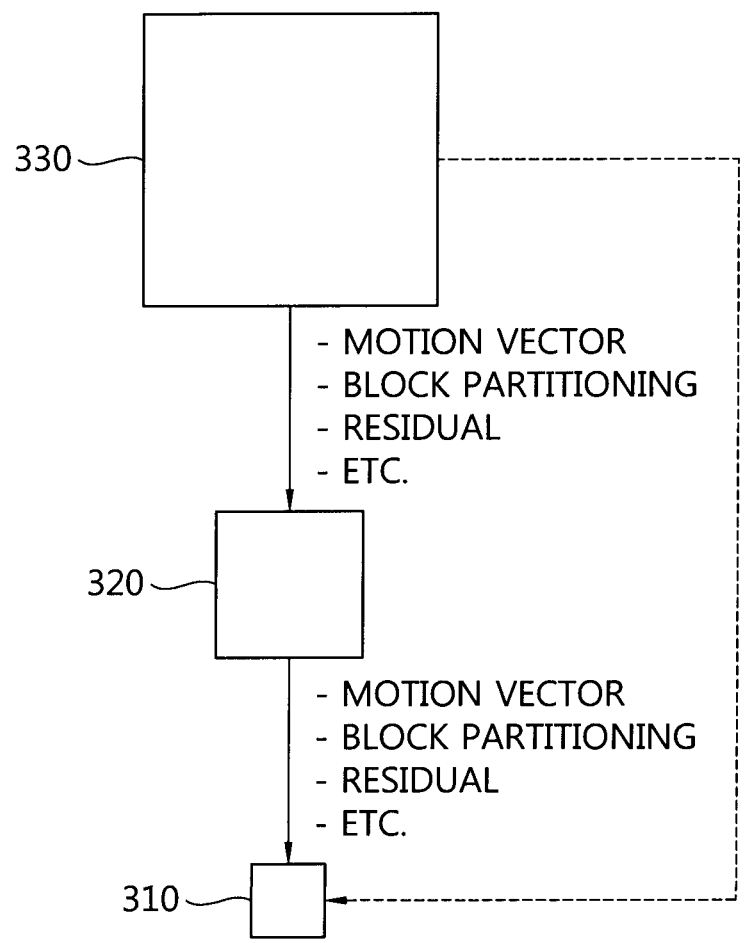
FIG. 3 illustrates a reference layer and an enhancement layer using information on the reference layer according to an embodiment of the present invention.

FIG. 3 illustrates a base layer, that is, a reference layer, and an enhancement layer using information on the reference layer according to an embodiment of the present invention.

A first enhancement layer 320 may refer to coded data, such as motion information including a motion vector, block partitioning and a residual, on the reference layer 310. That is, the coded data may mean syntax and semantics information transmitted from the encoding apparatus.

Also, as illustrated, a second enhancement layer 330 may refer to coded data, such as a motion vector, block partitioning and a residual, on the reference layer 310 and the first enhancement layer 320.

The second enhancement layer 330 may refer to the reference layer 310 only or the first enhancement layer 320 only.

As shown in FIG. 3, when the enhancement layers refer to information on a lower layer, dependency on information on a coded block or coded picture of a reference layer may be considered. For instance, motion prediction of the enhancement layers may be performed by referring to motion information, such as a motion vector.

In the present invention, dependency may be used to indicate use of information on a lower reference layer for decoding an upper layer, such as an enhancement layer, a relationship therebetween, or a reference type of referencing a lower layer in a particular scalability type. Dependency is required to be clearly signaled for inter-layer prediction.

The coded data does not need decoding, and the decoding apparatus may acquire the coded data through parsing. Since parsing is necessary, the reference layer and the enhancement layers referring to the reference layer need to be coded by the same codec scheme.

In the present invention, a codec scheme refers to a scheme for coding a video and decoding the coded video, and a video may generally be coded and decoded using the same scheme in accordance with a predetermined standard. Currently available codec schemes include H.264/Moving Picture Experts Group (MPEG) Advanced Video Coding (AVC), High Efficiency Video Coding (HEVC) Scalable Extension, and the like.

H.264/MPEG-4 Part 10 or AVC is a video compression standard that is currently one of the most commonly used formats for recording, compression and distribution of video content and has high data compression capability. This standard is developed by conducting standardization by the International Telecommunication Union Telecommunication Standardization Sector (ITU-T) Video Coding Experts Group (VCEG) together with the International Organization for Standardization (ISO)/International Electrotechnical Commission (IEC) Moving Picture Experts Group (MPEG) as the Joint Video Team (JVT). Thus, the ITU-T H.264 standard and the ISO/IEC MPEG-4 AVC standard (formally, ISO/IEC 14496-10—MPEG-4 Part 10, Advanced Video Coding) have identical technical content. A draft of the standard was present in May 2003.

High Efficiency Video Coding (HEVC) is a next-generation video encoding technique developed in succession to H.264/MPEG-4 AVC. The ISO/IEC MPEG and the ITU-T VCEG, which developed H.264/MPEG-4 AVC, established a Joint Collaborative Team on Video Coding (JCT-VC) in January 2003 and is currently developing HEVC. Standardization of HEVC has been finalized. A Main profile is defined, and scalable video coding and three-dimensional (3D) video coding technologies are being developed based on the Main profile.

On Jan. 25, 2013, the ITU announced that HEVC had been approved as a final next-generation draft standard in Geneva, Switzerland. HEVC has an ISO/IEC standard number of ISO/IEC 23008-2 and is currently in Final Draft International Standard (FDIS) status. The ISO/IEC standard number was issued as H.265 on Apr. 13, 2013.

The encoding module 105 for layer 1, that is, the enhancement layer, of FIG. 1 and the decoding module 210 for the enhancement layer of FIG. 2 may be paired with each other to process videos coded by the same codec scheme, and the encoding module 135 for layer 0, that is, the reference layer, of FIG. 1 and the decoding module 250 for the reference layer 0 of FIG. 2 may also be paired with each other to process videos coded by the same codec scheme.

When different codec schemes are used, parsing schemes for parsing information are different, and thus coded data that needs to be parsed may not be referenced for videos coded by different codec schemes.

Thus, when there is inter-layer dependency on coded data as in FIG. 3, a reference layer and an enhancement layer referring to the reference layer need to be coded by the same codec. Thus, inter-layer dependency information on coded data may be information indicating whether a referenced layer and a referring layer are coded by the same encoding mode, that is, whether the same codec scheme is used.

For example, when a reference layer is coded in accordance with H.264/MPEG AVC, an enhancement layer also needs to be coded by H.264/MPEG AVC so that the enhancement layer uses coded information on the reference layer.

If the reference layer is coded in accordance with H.264/MPEG AVC and the enhancement layer referring to the reference layer is coded by HEVC Scalable Extension instead of H.264/MPEG AVC, the enhancement layer cannot refer to the coded data on the reference layer because parsing modules of the decoding apparatus which decodes the two layers have different structures.

When there is inter-layer dependency on coded data, single-loop decoding which performs independent decoding by layer is possible.

Meanwhile, there is inter-layer dependency on reconstructed values, not on coded data.

Figure 4:
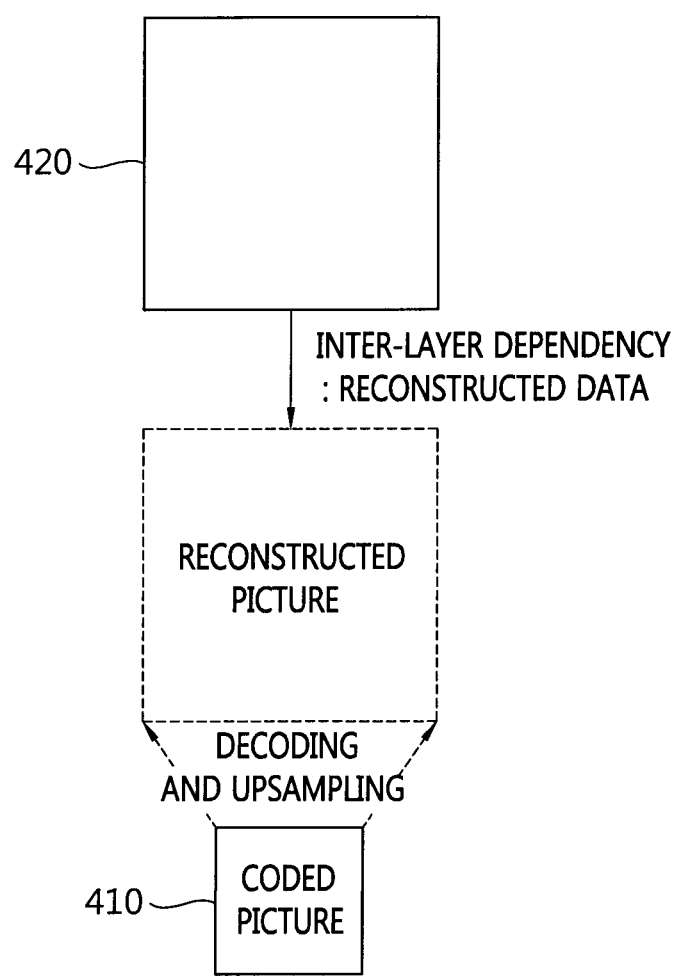
FIG. 4 illustrates a reference layer and an enhancement layer using information on the reference layer according to another embodiment of the present invention.

FIG. 4 illustrates a base layer, that is, a reference layer 410, and an enhancement layer 420 using information on the reference layer 410 according to another embodiment of the present invention.

The enhancement layer 420 may refer to reconstructed data on the reference layer 410, that is, a pixel value or a sample value of a reference picture or reference block reconstructed via decoding, or data obtained via a reconstruction process. The reconstructed data may be upsampled corresponding to the size of a picture of the enhancement layer as shown in FIG. 4.

Information on the reconstructed sample value may be used for texture prediction, that is, sample prediction, of the enhancement layer 420.

Although not shown, an additional enhancement layer may be present as shown in FIG. 3, in which case the additional enhancement layer may refer to reconstructed data, such as a pixel value of at least one of the reference layer and the lower enhancement layer.

When there is inter-layer dependency on reconstructed data is present as in FIG. 4, how a reference picture of the reference layer is coded, that is, a coding method or codec scheme, is not necessary for the enhancement layer to refer to the reference layer. That is, although the enhancement layer and the reference layer are coded by different codec schemes and subjected to decoding, inter-layer dependence may be established when only reconstructed data for reference is present.

Thus, as compared with dependency on coded data, when there is inter-layer dependency on reconstructed data, it is possible that an enhancement layer refers to a reference layer even though different codec schemes are used for the layers.

When there is inter-layer dependency on reconstructed data, decoded information on a reference layer is needed for decoding an enhancement layer, and thus multi-loop decoding is required.

As described above, sameness of codec schemes may affect inter-layer dependency depending on whether an enhancement layer refers to coded data or reconstructed data on a reference layer.

That is, the decoding apparatus may use coded data for prediction of layers coded by different codec schemes and use coded data and reconstructed data for layers coded by the same codec structure.

The present invention provides the decoding apparatus capable of clearly signaling a dependency relationship and performing inter-layer prediction based on the signaled dependency relationship.

Figure 5:
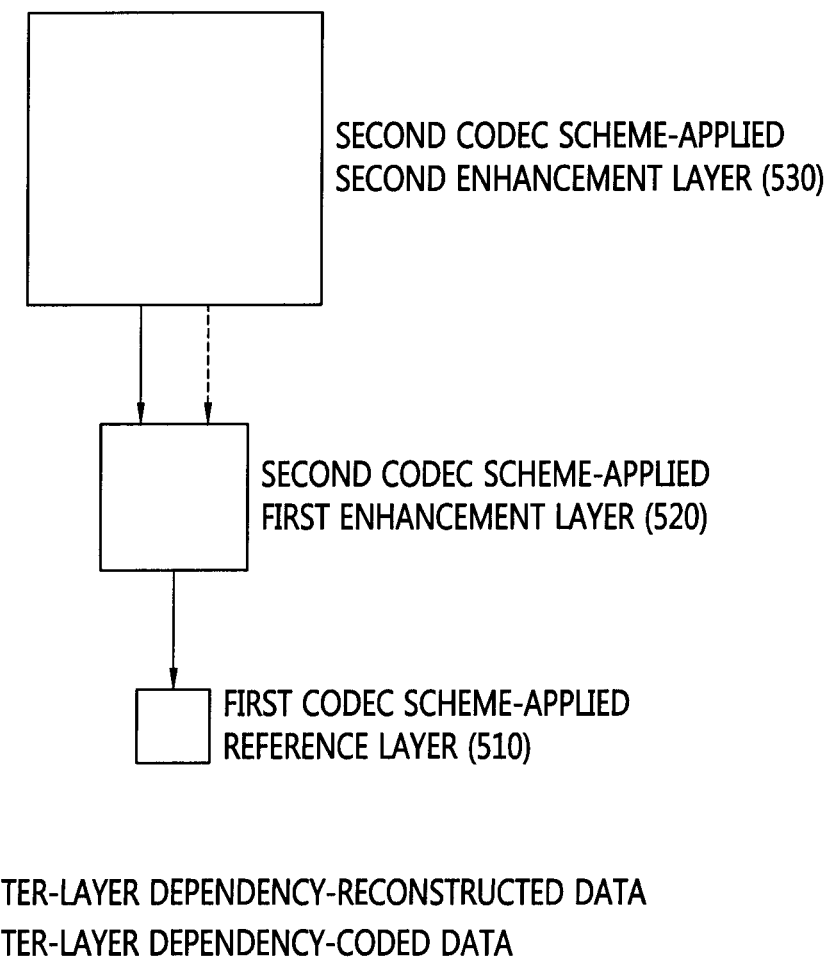
FIG. 5 illustrates a reference layer and an enhancement layer using information on the reference layer according to still another embodiment of the present invention.

FIG. 5 illustrates a reference layer and an enhancement layer using information on the reference layer according to still another embodiment of the present invention.

As illustrated in FIG. 5, the reference layer 510 may be coded in accordance with a first codec scheme, for example, H.264/MPEG AVC, and a first enhancement layer 520 and a second enhancement layer 530 may be coded in accordance with a second codec scheme, for example, HEVC Scalable Extension.

Schemes for coding the layers are not limited to FIG. 5, and the first enhancement layer and the second enhancement layer may also be coded by different codec schemes.

Referring to FIG. 5, inter-layer dependency clearly varies depending on a codec scheme. The first enhancement layer 520 may use reconstructed information on the reference layer 510 coded by the first codec scheme despite difference in codec scheme, and thus reconstructed data dependency is present between the first enhancement layer 520 and the reference layer 510. That is, since the first enhancement layer 520 and the reference layer 510 are coded by the different codec schemes, there is no coded data dependency between the two layers.

On the contrary, since the second enhancement layer 530 is coded by the same codec scheme as that for the first enhancement layer 520, the second enhancement layer 530 may refer to both coded data and reconstructed data on the first enhancement layer 520. That is, the second enhancement layer 530 may have direct dependency on both the reconstructed data and the coded data on the first enhancement layer 520.

Since the second enhancement layer 530 is coded by the different scheme from that for the reference layer 510, the second enhancement layer 530 may not have dependency on coded data on the reference layer 510 but have dependency on reconstructed data on the reference layer 510.

To sum up, considering dependency on coded data and dependency on reconstructed data as different types of dependency, different types of dependency may be established among layers depending on codec schemes used for coding the respective layers. In FIG. 5, the first enhancement layer 520 has direct dependency on the reconstructed data on the reference layer 510, and the second enhancement layer 530 has direct dependency on the reconstructed data and coded data on the first enhancement layer 520. The second enhancement layer 530 may have direct dependency on the reconstructed data on the reference layer 510.

When upper layers have different types of dependency in referring to lower layers as mentioned above, signaling dependency is important so that the decoding apparatus accurately identifies dependency and performs decoding.

Figure 6:
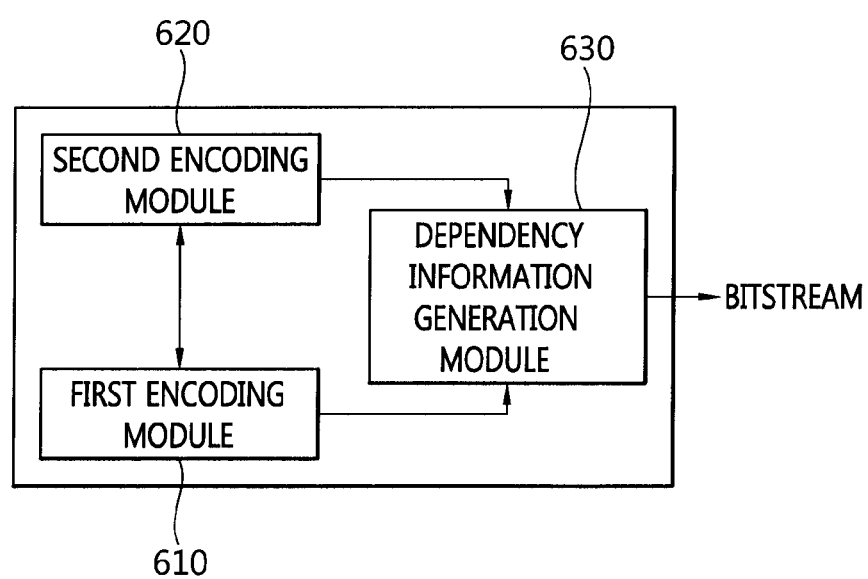
FIG. 6 is a block diagram illustrating a video encoding apparatus according to an embodiment of the present invention.

FIG. 6 is a block diagram illustrating a video encoding apparatus according to an embodiment of the present invention.

As shown in FIG. 6, the encoding apparatus according to the present embodiment includes a first encoding module 610, a second encoding module 620 and a dependency information generation module 630.

The first encoding module 610 may correspond to the encoding module 135 for encoding layer 0 in the video encoding apparatus of FIG. 1, and the second encoding module 620 may correspond to the encoding module 105 for encoding layer 1 in the video encoding apparatus of FIG. 1.

The first encoding module 610 and the second encoding module 620 perform prediction, transformation and entropy-coding of a video of each layer, and descriptions thereof are substantially the same as those of the encoding apparatus mentioned with reference to FIG. 1 and thus are omitted herein.

The encoding apparatus may encode three or more layers, in addition to two layers, and may further include a third encoding module and a fourth encoding module in this case.

The dependency information generation module 630 according to the present embodiment generates dependency information indicating which information layers refer to when the layers are encoded by the encoding modules 610 and 620. The dependency information generation module 630 may be a part included in the first encoding module 610 or a part included in the second encoding module 620. Alternatively, the dependency information generation module 630 may be designed to be included in each of the encoding modules 610 and 620. That is, although the dependency information generation module 630 is shown as an independent component in FIG. 6 for convenience of description, a physical structure and position of the dependency information generation module 630 are not limited to FIG. 6.

The information generated by the dependency information generation module 630 is encoded and transmitted as a bitstream to a video decoding apparatus, similar to other types of information.

Table 1 illustrates syntax elements of the dependency information generated by the dependency information generation module 630 according to one embodiment of the present invention.

TABLE 1

| | Descriptor |
|---|---|
| vps_extension( ) { | |
| ... | |
|    for (i = 1; i<= vps_max_layers_minus1 ; i++) { | |
|       ... | |
|       num_direct_ref_layers[ i ] | u(6) |
|       for( j = 0; j <num_direct_ref_layers[ i ]; j++ ) | |
|          ref_layer_id[ i ][ j ] | u(6) |
|          inter_layer_coded_flag[ i ][ j ] | u(1) |
|          inter_layer_reconstructed_flag[ i ][ j ] | u(1) |
|    } | |
| } | |

Referring to Table 1, inter-layer dependency information is included and signaled in a video parameter set (VPS).

num_direct_ref_layers[i] specifies the number of layers on which an i-th layer directly depends. For example, in a bitstream having a reference layer and two enhancement layers, a highest enhancement layer may have direct dependency on at most two layers.

ref_layer_id[i][j] indicates a j-th layer on which the i-th layer directly depends and specifies information for identifying a reference layer to which a particular layer refers.

inter_layer_coded_flag[i][j] is flag information indicating whether the i-th layer has dependency on coded data on the j-th layer when the i-th layer refers to a layer identified as the j-th layer. inter_layer_coded_flag[i][j] equal to 1 indicates that the i-th layer has dependency on the coded data on the j-th layer, and inter_layer_coded_flag[i][j] equal to 0 indicates that the i-th layer has no dependency on the coded data on the j-th layer.

inter_layer_reconstructed_flag[i][j] is flag information indicating whether the i-th layer has dependency on reconstructed data on the j-th layer when the i-th layer refers to a layer identified as the j-th layer. inter_layer_reconstructed_flag[i][j] equal to 1 indicates that the i-th layer has dependency on the reconstructed data on the j-th layer, and inter_layer_reconstructed_flag[i][j] equal to 0 indicates that the i-th layer has no dependency on the reconstructed data on the j-th layer.

That is, the foregoing pieces of flag information serve to directly indicate whether an upper layer uses coded information or reconstructed information on a lower layer when an inter-layer reference relationship is signaled. The flag information may directly indicate a dependency type when a reference relationship is established between layers.

Table 2 illustrates syntax elements of the dependency information generated by the dependency information generation module 630 according to another embodiment of the present invention.

TABLE 2

| | Descriptor |
|---|---|
| slice_header_in_scalable_extension( ) { | |
|    ... | |
|    inter_layer_coded_flag[ i ][ j ] | u(1) |
|    inter_layer_reconstructed_flag[ i ][ j ] | u(1) |
|    ... | |
| } | |

Referring to Table 2, inter-layer dependency information is included and signaled in a slice header (slice_header). That is, the inter-layer dependency information is generated by slice and transmitted to a video decoding apparatus.

inter_layer_coded_flag[i][j] is flag information indicating whether a coded treeblock included in a slice has dependency on coded data on a reference layer when the coded treeblock refers to the reference layer. inter_layer_coded_flag[i][j] equal to 1 indicates that the slice has dependency on the coded data on the reference layer, and inter_layer_coded_flag[i][j] equal to 0 indicates that the slice has no dependency on the coded data on the reference layer.

inter_layer_reconstructed_flag[i][j] is flag information indicating whether the coded treeblock included in the slice has dependency on reconstructed data on the reference layer when the coded treeblock refers to the reference layer. inter_layer_reconstructed_flag[i][j] equal to 1 indicates that the slice has dependency on the reconstructed data on the reference layer, and inter_layer_reconstructed_flag[i][j] equal to 0 indicates that the slice has no dependency on the reconstructed data on the reference layer.

Figure 7:
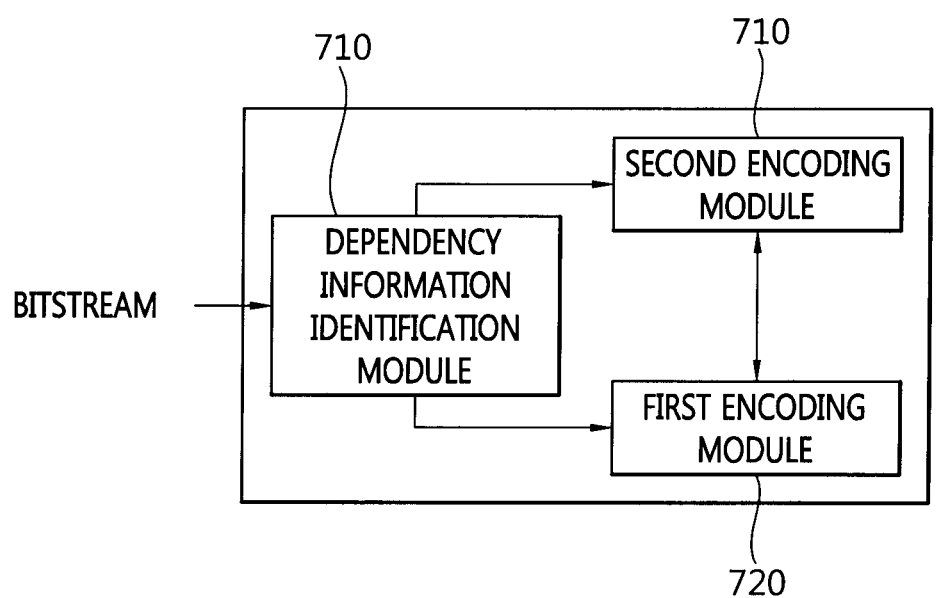
FIG. 7 is a block diagram illustrating a video decoding apparatus according to an embodiment of the present invention.

FIG. 7 is a block diagram illustrating a video decoding apparatus according to an embodiment of the present invention.

As illustrated in FIG. 7, the decoding apparatus according to the present embodiment includes a dependency information identification module 710, a first decoding module 720 and a second decoding module 730.

The dependency information identification module 710 identifies, based on a bitstream received from the video encoding apparatus, dependency information indicating which information layers refer to when the layers are encoded by the respective decoding modules 720 and 730. The dependency information identification module 710 may be configured as a parsing module for parsing a bitstream or as an entropy decoding module for entropy-decoding a bitstream.

The dependency information identification module 710 may be a part included in the first decoding module 720 or a part included in the second decoding module 730. Alternatively, the dependency information identification module 710 may be designed as a plurality of components included in the respective decoding modules 720 and 730. That is, although the dependency information identification module 710 is shown as an independent component in FIG. 7 for convenience of description, a physical structure and position of dependency information identification module 710 are not limited to FIG. 7.

The dependency information received from the encoding apparatus and identified by the dependency information identification module 710 may be information indicating whether an upper layer refers to coded data on a lower layer, which may be, for example, flag information inter_layer_coded_flag[i][j] illustrated in Tables 1 and 2.

The dependency information may also be information indicating whether the upper layer refers to reconstructed data on the lower layer, which may be, for example, flag information inter_layer_reconstructed_flag[i][j] illustrated in Tables 1 and 2.

The foregoing pieces of flag information may indicate a dependency type of the lower layer to which the upper layer refers. When the dependency information is inter_layer_coded_flag[i][j] and has a flag value equal to 1, the flag information may specify a dependency type indicating that the upper layer may refer to the coded data on the lower layer.

The dependency information indicating dependency on the coded data may be interpreted as that the upper layer and the lower layer are coded by the same codec scheme, and further as that the upper layer may perform motion prediction using the coded data, particularly motion information. That is, the flag information may be interpreted as various preset meanings.

The flag value of the dependency information equal to 0 may be interpreted as that the upper layer does not use the code data on the lower data or as that the two layers are coded by different codec schemes.

When the dependency information is inter_layer_reconstructed_flag[i][j] and has a flag value equal to 1, the flag information may specify a dependency type indicating that the upper layer may refer to the reconstructed data on the lower layer. The reconstructed data may be used for texture prediction, that is, sample prediction, of the upper layer.

The dependency information may be included and received in a video parameter set in a bitstream as in Table 1 or in a slice header as in Table 2.

The inter-layer dependency information identified by the dependency information identification module 710 is transmitted to the decoding modules 720 and 730, and the decoding modules 720 and 730 may perform inter-layer prediction and reconstruction based on the dependency information.

The first decoding module 720 may correspond to the decoding module 250 for decoding layer 0 in the video decoding apparatus of FIG. 2, and the second decoding module 730 may correspond to the decoding module 210 for decoding layer 1 in the video decoding apparatus of FIG. 2.

The first decoding module 720 and the second decoding module 730 perform entropy-decoding, inverse transformation, prediction and reconstruction of a video of each layer, and descriptions thereof are substantially the same as those of the decoding apparatus mentioned with reference to FIG. 2 and thus are omitted herein.

The decoding apparatus may decode three or more layers, in addition to two layers, and may further include a third decoding module and a fourth decoding module in this case.

Figure 8:
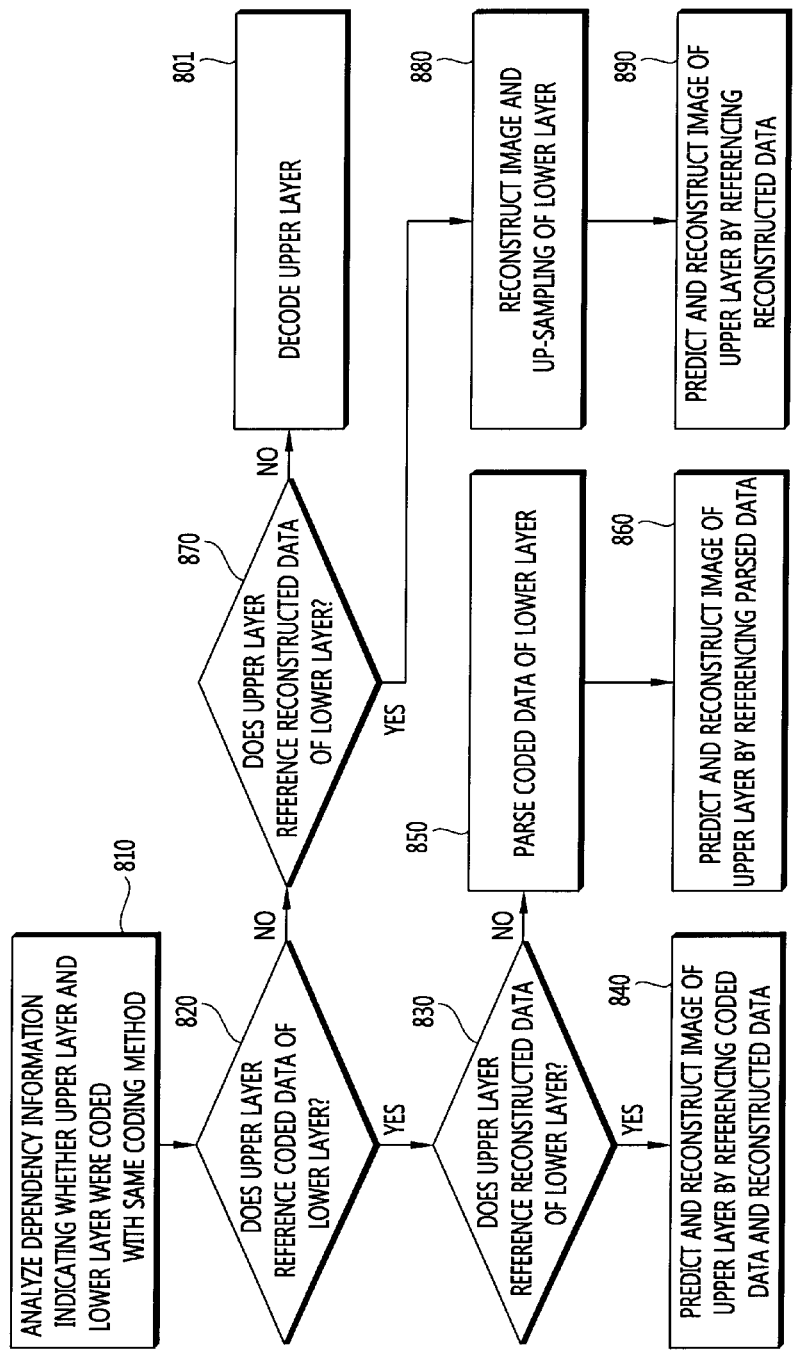
FIG. 8 is a flowchart illustrating a video decoding method according to an embodiment of the present invention.

FIG. 8 is a flowchart illustrating a video decoding method according to an embodiment of the present invention. The video decoding method according to the present embodiment is described below with reference to FIG. 8.

First, a dependency information identification module which may be configured as a parsing module or entropy-decoding module identifies dependency information on an upper layer referring to a lower layer in a bitstream (S810).

The dependency information may be included and received in a video parameter set or slice header and be information for indicating whether the upper layer is coded in the same coding mode as that for the lower layer. The dependency information may include flag information indicating dependency on reconstructed data or coded data.

As a result of identification, when a flag indicating dependency on coded data is 1 which means that the upper layer has dependency on coded data on the lower layer (S820), the dependency information identification module may subsequently identify whether the upper layer refers to reconstructed data on the lower layer, that is, dependency on the reconstructed data (S830).

As a result, when the upper layer has dependency on the reconstructed data on the lower layer, that is, when the upper layer refers to both the coded data and reconstructed data on the lower layer, a decoding module for the upper layer may predict and reconstruct a video of the upper layer by referring to both the coded data and reconstructed data on the lower layer (S840).

In this case, since the flag indicating dependency on the coded data is 1, the upper layer and the lower layer are identified as being decoded by the same codec scheme.

Here, the coded data on the lower layer may be at least one of motion information including a motion vector, block partitioning and a residual with respect to a video of the lower layer, and the reconstructed data on the lower layer may be a pixel value of a video of the lower layer and/or an upsampled value of the pixel value.

A decoding apparatus may parse the coded data on the lower layer and reconstruct a pixel value of the lower layer to use the coded data and the pixel value for predicting and reconstructing the upper layer.

That is, the decoding apparatus may perform sample prediction of the upper layer using a reconstructed value of the lower layer and perform motion prediction using motion information on the lower layer.

However, when the upper layer has no dependency on the reconstructed data on the lower layer, that is, when the upper layer refers to the coded data on the lower layer only, the decoding apparatus parse the coded data on the lower layer (S850).

The coded data on the lower layer may be at least one of motion information including a motion vector, block partitioning and a residual with respect to a video of the lower layer.

The decoding module for decoding the upper layer may perform prediction, such as partitioning the video of the upper layer to be decoded and motion compensation, with reference to the coded data and decoding, such as reconstruction of a video, using residual information (S860).

In this case, since the flag indicating dependency on the coded data is also 1, the upper layer and the lower layer are identified as being decoded by the same codec scheme.

Meanwhile, when the upper layer has no dependency on the coded data on the lower layer (S820), it may be identified whether the upper layer refers to the reconstructed data on the lower layer, that is, dependency on the reconstructed data. In this case, the upper layer and the lower layer may be coded by the same codec scheme or by different codec schemes.

When it is identified through the flag information that the upper layer refers to the reconstructed data on the lower layer, that is, when the upper layer refers to the reconstructed data on the lower layer only (S870), a decoding module for decoding the lower layer may perform decoding and upsampling for reconstructing the video of the lower layer (S880).

Decoding and/or upsampling the lower layer may be performed before decoding of the upper layer, and the reconstructed data on the lower layer, such as a pixel value, generated via decoding may be stored in a memory, such as a decoded picture buffer (DPB). Alternatively, the reconstructed data may be reconstructed and/or upsampled in decoding when necessary.

The decoding module for decoding the upper layer predicts and reconstructs the video of the upper layer by referring to the reconstructed data (S890).

Meanwhile, when the upper layer has no dependency on the coded data and reconstructed data on the lower layer, the decoding module for decoding the upper layer may perform general decoding using information on the upper layer only (S801).

As described above, the present invention relates to a method for predicting a current layer using information on another layer and provides a method and an apparatus for receiving and identifying information indicating whether information on a reference layer that the current layer refers to is coded data or a reconstructed value.

Accordingly, when videos coded by different coding schemes modes are decoded, an inter-layer dependency type may also be identified.

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments may include various examples. Therefore, the invention includes all substitutions, corrections, and modifications belonging to the appended claims.

The invention claimed is:

1. A video decoding method, comprising:
receiving, by a decoding apparatus, and identifying dependency information through a video parameter set (VPS) extension syntax, wherein the dependency information indicates a dependency type for a current layer;
performing, by the decoding apparatus, inter-layer prediction for a current block based on the dependency information; and
reconstructing, by the decoding apparatus, a current picture based on the result of the inter-layer prediction,
wherein the dependency information indicates the dependency type among 1) a first dependency type representing a reference layer is available for inter-layer sample prediction of the current layer but is unavailable for inter-layer motion prediction of the current layer, 2) a second dependency type representing the reference layer is available for inter-layer motion prediction but is unavailable for inter-layer sample prediction, 3) a third dependency type representing the reference layer is available for both inter-layer motion prediction and inter-layer sample prediction of the current layer.

2. The method of claim 1, wherein when the dependency information indicates the first dependency type as the dependency type, reconstructed samples in the reference layer are used for the inter-layer prediction for the current block.

3. The video decoding method of claim 2, wherein performing the inter-layer prediction includes:
upsampling the reconstructed samples of a reference block in the reference layer,
deriving predicted samples of the current block based on the upsampled reconstructed samples.

4. The method of claim 1, wherein when the dependency information indicates the second dependency type as the dependency type, motion information in the reference layer is used for the inter-layer prediction for the current block.

5. The method of claim 1, wherein performing the inter-layer prediction includes:
deriving motion information of the current block based on the motion information of a corresponding block in the reference layer,
deriving predicted samples of the current block based on the derived motion information.

6. The method of claim 5, wherein the motion information of the current block is derived by scaling the motion information of the corresponding block in the reference layer.

7. The method of claim 1, wherein the dependency information including a coded data dependency flag and a reconstructed data dependency flag,
wherein if a value of the coded data dependency flag is 0 and a value of the reconstructed data dependency flag is 1, the dependency information indicates that the first dependency type is used as the dependency type of the current layer,
wherein if the value of the coded data dependency flag is 1 and the value of the reconstructed data dependency flag is 0, the dependency information indicates that the second dependency type is used as the dependency type of the current layer, and
wherein if the value of the coded data dependency flag is 1 and the value of the reconstructed data dependency flag is 1, the dependency information indicates that the third dependency type is used as the dependency type of the current layer.

8. A video decoding apparatus, comprising:
a dependency information identification module to receive and identify dependency information through a video parameter set (VPS) extension syntax, wherein the dependency information, indicates a dependency type for a current layer; and
a prediction module to perform inter-layer prediction for a current block based on the dependency information; and
an adder module to reconstruct a current picture based on the result of the inter-layer prediction,
wherein the dependency information indicates the dependency type among 1) a first dependency type representing a reference layer is available for inter-layer sample prediction of the current layer but is unavailable for inter-layer motion prediction of the current layer, 2) a second dependency type representing the reference layer is available for inter-layer motion prediction but is unavailable for inter-layer sample prediction, 3) a third dependency type representing the reference layer is available for both inter-layer motion prediction and inter-layer sample prediction of the current layer.

9. The video decoding apparatus of claim 8, wherein when the dependency information indicates the first dependency type as the dependency type, reconstructed samples in the reference layer are used for the inter-layer prediction for the current block.

10. The video decoding apparatus of claim 9, wherein performing the inter-layer prediction includes:
upsampling the reconstructed samples of a reference block in the reference layer; and
deriving predicted samples of the current block based on the upsampled reconstructed samples.

11. The video decoding apparatus of claim 8, wherein when the dependency information indicates the second dependency type as the dependency type, motion information in the reference layer is used for the inter-layer prediction for the current block.

12. The video decoding apparatus of claim 11, wherein performing the inter-layer prediction includes:
deriving motion information of the current block based on the motion information of a corresponding block in the reference layer; and
deriving predicted samples of the current block based on the derived motion information.

13. The video decoding apparatus of claim 12, wherein the motion information of the current block is derived by scaling the motion information of the corresponding block in the reference layer.

14. The video decoding apparatus of claim 8, wherein the dependency information includes a coded data dependency flag and a reconstructed data dependency flag,
wherein if a value of the coded data dependency flag is 0 and a value of the reconstructed data dependency flag is 1, the dependency information indicates that the first dependency type is used as the dependency type of the current layer, wherein if the value of the coded data dependency flag is 1 and the value of the reconstructed data dependency flag is 0, the dependency information indicates that the second dependency type is used as the dependency type of the current layer, and wherein if the value of the coded data dependency flag is 1 and the value of the reconstructed data dependency flag is 1, the dependency information indicates that the third dependency type is used as the dependency type of the current layer.

* * * * *